United States Patent
Cavagne et al.

(10) Patent No.: US 10,920,935 B2
(45) Date of Patent: Feb. 16, 2021

(54) INSULATED CHAMBER AND METHOD FOR FLUSHING SUCH A CHAMBER

(71) Applicant: L'AIR LIQUIDE, SOCIETE ANONYME POUR L'ETUDE ET L'EXPLOITATION DES PROCEDES GEORGES CLAUDE, Paris (FR)

(72) Inventors: Patrice Cavagne, Le Perreux sur Marne (FR); Frederic Crayssac, Velizy (FR)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 969 days.

(21) Appl. No.: 15/117,880

(22) PCT Filed: Feb. 3, 2015

(86) PCT No.: PCT/FR2015/050242
§ 371 (c)(1),
(2) Date: Aug. 10, 2016

(87) PCT Pub. No.: WO2015/121562
PCT Pub. Date: Aug. 20, 2015

(65) Prior Publication Data
US 2017/0009940 A1  Jan. 12, 2017

(30) Foreign Application Priority Data
Feb. 11, 2014  (FR) ...................................... 1451026

(51) Int. Cl.
*F17C 13/00* (2006.01)
*F25J 3/04* (2006.01)

(52) U.S. Cl.
CPC ........... *F17C 13/001* (2013.01); *F25J 3/0489* (2013.01); *F25J 3/04945* (2013.01);
(Continued)

(58) Field of Classification Search
CPC ......... F17C 13/001; F17C 3/10; F25J 3/0489; F25J 3/04945
See application file for complete search history.

(56) References Cited

U.S. PATENT DOCUMENTS 3,396,470 A * 8/1968 Wood ...................... B63B 39/12
33/717
3,406,526 A * 10/1968 Lusk ...................... F17C 3/022
62/48.3

(Continued)

FOREIGN PATENT DOCUMENTS

| DE | 10 2006 028313 | 12/2007 |
|---|---|---|
| EP | 1 520 079 | 4/2005 |
| EP | 2 503 269 | 9/2012 |
| FR | 2 509 839 | 1/1983 |
| FR | 2 832 211 | 5/2003 |
| WO | WO 2004/015347 | 2/2004 |

OTHER PUBLICATIONS

International Search Report and Written Opinion for PCT/FR2015/050242, dated Mar. 26, 2015.

*Primary Examiner* — Anthony D Stashick
*Assistant Examiner* — Blaine G Neway
(74) *Attorney, Agent, or Firm* — Justin K. Murray

(57) ABSTRACT

The invention relates to an insulated chamber comprising at least one element that may operate at sub-ambient temperature, the space around the element(s) being filled with solid insulation and means for injecting a gas containing at least 95 mol-% nitrogen into the insulation, at least some of the gas-injection means opening at a position vertically above at least one element to insulate.

18 Claims, 2 Drawing Sheets

(52) U.S. Cl.
CPC ........... *F17C 2201/0109* (2013.01); *F17C 2201/035* (2013.01); *F17C 2201/052* (2013.01); *F17C 2201/054* (2013.01); *F17C 2203/014* (2013.01); *F17C 2203/032* (2013.01); *F17C 2203/035* (2013.01); *F17C 2203/0341* (2013.01); *F17C 2203/0379* (2013.01); *F17C 2203/0391* (2013.01); *F17C 2203/0607* (2013.01); *F17C 2203/0629* (2013.01); *F17C 2203/0639* (2013.01); *F17C 2203/0643* (2013.01); *F17C 2205/0107* (2013.01); *F17C 2205/0111* (2013.01); *F17C 2205/0176* (2013.01); *F17C 2205/0192* (2013.01); *F17C 2209/227* (2013.01); *F17C 2221/033* (2013.01); *F17C 2223/0161* (2013.01); *F17C 2223/033* (2013.01); *F17C 2270/0105* (2013.01); *F25J 2210/42* (2013.01); *Y02E 60/32* (2013.01)

(56) References Cited

U.S. PATENT DOCUMENTS

| | | | | |
|---|---|---|---|---|
| 3,521,493 | A * | 7/1970 | Pannetier | G01N 1/22 73/863.12 |
| 3,699,696 | A * | 10/1972 | Rhoton | F17C 7/00 62/45.1 |
| 4,300,356 | A * | 11/1981 | Notaro | F17C 3/02 505/888 |
| 4,407,144 | A * | 10/1983 | Garside | F17C 3/10 62/239 |
| 4,662,921 | A * | 5/1987 | Dean | F17C 13/001 220/88.3 |
| 6,378,331 | B1 * | 4/2002 | Vancauwenberghe | F25J 3/04872 62/643 |
| 9,285,164 | B2 | 3/2016 | Wilhelm | |

* cited by examiner ature. It
also relates to a method for flushing such a chamber.

INSULATED CHAMBER AND METHOD FOR FLUSHING SUCH A CHAMBER

CROSS REFERENCE TO RELATED APPLICATIONS

This application is a § 371 of International PCT Application PCT/FR2015/050242, filed Feb. 3, 2015, which claims the benefit of FR1451026, filed Feb. 11, 2014, both of which are herein incorporated by reference in their entireties.

FIELD OF THE INVENTION

The present invention relates to an insulated chamber, particularly to a chamber insulated using a solid insulation, operating at a subambient or even cryogenic temperature. It also relates to a method for flushing such a chamber.

BACKGROUND OF THE INVENTION

Air separation units have an insulation system that makes it possible to limit exchanges of heat between the external environment and the various industrial equipment such as columns and exchangers. This insulating system generally employs one (or more) insulating material (s) (perlite, rockwool, etc.) contained, for mechanical reasons, in large metallic structures commonly referred to as "cold boxes". These chambers are not sealed against the external air and, for reasons of thermal efficiency and of safety, a continuous flow of gaseous nitrogen is flushed through the inside of these cold boxes.

U.S. Pat. No. 4,662,921 and FR-A-2509839 show that it is known practice to send nitrogen through an opening in the roof of the chamber so that the nitrogen passes freely through the insulation that fills the chamber without being channeled by a pipe. Such arrangements do not allow good distribution of the nitrogen.

As illustrated in WO-A-2004015347, it is known practice to send gaseous nitrogen from the distillation into the insulation by means of a distributer positioned in the middle of the mass of insulation. This too does not allow optimal distribution of the inert gas.

SUMMARY OF THE INVENTION

In order to maintain a dry atmosphere in the insulation of a cold box, use is generally made of nitrogen from the inert gas network of the factory, with an oxygen content of below 5%, creating a slight overpressure with respect to atmospheric pressure in order to avoid any ingress of damp air into the insulation. This fluid needs to be perfectly dry and degreased. This is because any ingress of moisture into the cold box has the effect of impairing the thermal performance of the insulation (perlite). In addition, an ingress of air, even dry air, carries a risk that oxygen-enriched air will condense as soon as the temperature of the insulation (near the cryogenic equipment) drops below the dew point of air. This phenomenon may subsequently present a risk of ignition and/or explosion with any readily flammable element in the enriched air.

Inside the main casing of the cold box it is also necessary to ensure that the atmosphere is continually replenished:
in order to remove the ambient air after opening and insulation,
in order to dilute and remove any air that may have entered.

The hourly flow rate to be taken into consideration for inerting needs to allow the atmosphere of the cold box to be renewed in around 24 h, namely with an hourly flow rate of ¹⁄₂₅ of the total volume of the box.

One subject of the invention is an insulated chamber comprising at least one element to be insulated which is capable of operating at a subambient temperature or even cryogenic temperature, the element being a storage facility or a distillation column or scrubbing column containing means allowing an exchange of heat and of matter or a heat exchanger or a vaporizer-condenser or a metal pipe or a filter, the space around the element or the elements being filled with solid insulation and means for injecting a gas containing at least 95 mol % nitrogen into the insulation, in which at least some of the means for injecting the gas into the insulation open into the insulation arranged at a position vertically above at least one element that is to be insulated, so that the gas can seep out to a location vertically above the element that is to be insulated.

According to other aspects of the invention:
at least some of the means for injecting the gas into the insulation open at a position directly vertically above at least one element that is to be insulated;
the element that is to be insulated is a storage facility;
the element that is to be insulated is a distillation or scrubbing column containing means allowing an exchange of heat and of matter;
the element that is to be insulated is a heat exchanger;
the element that is to be insulated is a vaporizer-condenser;
the element that is to be insulated is a metal pipe;
the element that is to be insulated is a filter;
the means for injecting a gas consists of at least one rigid perforated pipe, preferably made of steel or of aluminum;
the means for injecting the gas are arranged in such a way that the gas enters the insulation of the chamber directly only via the top of the chamber;
the perforated pipe comprises at most a single perforation per 50 mm of length of pipe, or even at most a single perforation per 100 mm of length of pipe;
the perforated pipe is surrounded by a permeable element so as to prevent insulation from entering via the perforations;
the insulation is perlite;
at least some of the means for injecting the gas consist of at least one porous pipe positioned vertically inside the chamber, having a length equal to at least half the height of the chamber, or even having a length substantially equal to the height of the chamber, the pipe being perforated, any porous pipe being arranged only in part of the chamber likely to operate at a temperature above a threshold, the threshold being higher than the minimum temperature of the chamber, it being possible for the threshold to be −100° C. or even −50° C.;
a porous pipe has a porosity of at least 5%;
the porous pipe is made of polyethylene or of polyvinyl chloride or of an agglomerate of rubber particles;
some of the means for injecting the gas consist of at least one rigid perforated pipe made of metal and the means for injecting the gas made up of at least one rigid perforated pipe are arranged at least in a part of the chamber that is supposed to operate at a temperature below the threshold;
at least some of the means for injecting the gas consist of at least three parallel flexible pipes positioned vertically inside the chamber, each having a length equal to at least half the height of the chamber, or even having a length substantially equal to the height of the chamber, the pipe being perforated, or even porous;

the flexible pipe is porous over its entire surface such that the pipe supplies gas over at least most of, or even all of, the height of the chamber;

the pores of the at least one flexible pipe have a diameter of between 1 and 100 μm;

at least some of the means for injecting the gas consist of at least one flexible pipe positioned horizontally inside the chamber, running along the roof of the chamber;

the solid insulation is a pulverulent insulation having particle sizes ranging for example from 150 to 800 μm;

a series of flexible pipes are arranged parallel to one another vertically along the walls of the chamber so that no part of the wall of the chamber is more than a minimal distance away from a pipe;

the means for injecting the gas consists of at least one pipe that penetrates the solid insulation;

the at least one pipe is connected to means for causing the nitrogen to circulate through the pipe from the bottom upward; and/or the at least one pipe is fixed on the inside of a vertical wall of the chamber.

The invention also provides a method for flushing an insulated chamber having several walls and being substantially airtight, inside the chamber there being at least one element that is to operate at a subambient or even cryogenic temperature, the space inside the chamber around the element or elements being filled with solid insulation, in which a gas containing at least 95 mol % nitrogen is injected into the insulation so that the gas is injected into the insulation in at least a position vertically above at least one element that is to be insulated so that the gas seeps out to a location vertically above the element that is to be insulated.

The gas can be distributed into the chamber by means of at least one pipe, preferably perforated, entering the solid insulation and running along a vertical wall of the chamber.

The chamber may potentially comprise several elements that are to be insulated and the method makes provision for injecting gas at least at a position vertically above each element.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION

The invention will be described in greater detail with reference to the figures which illustrate insulated chambers according to the invention.

Figure 1:
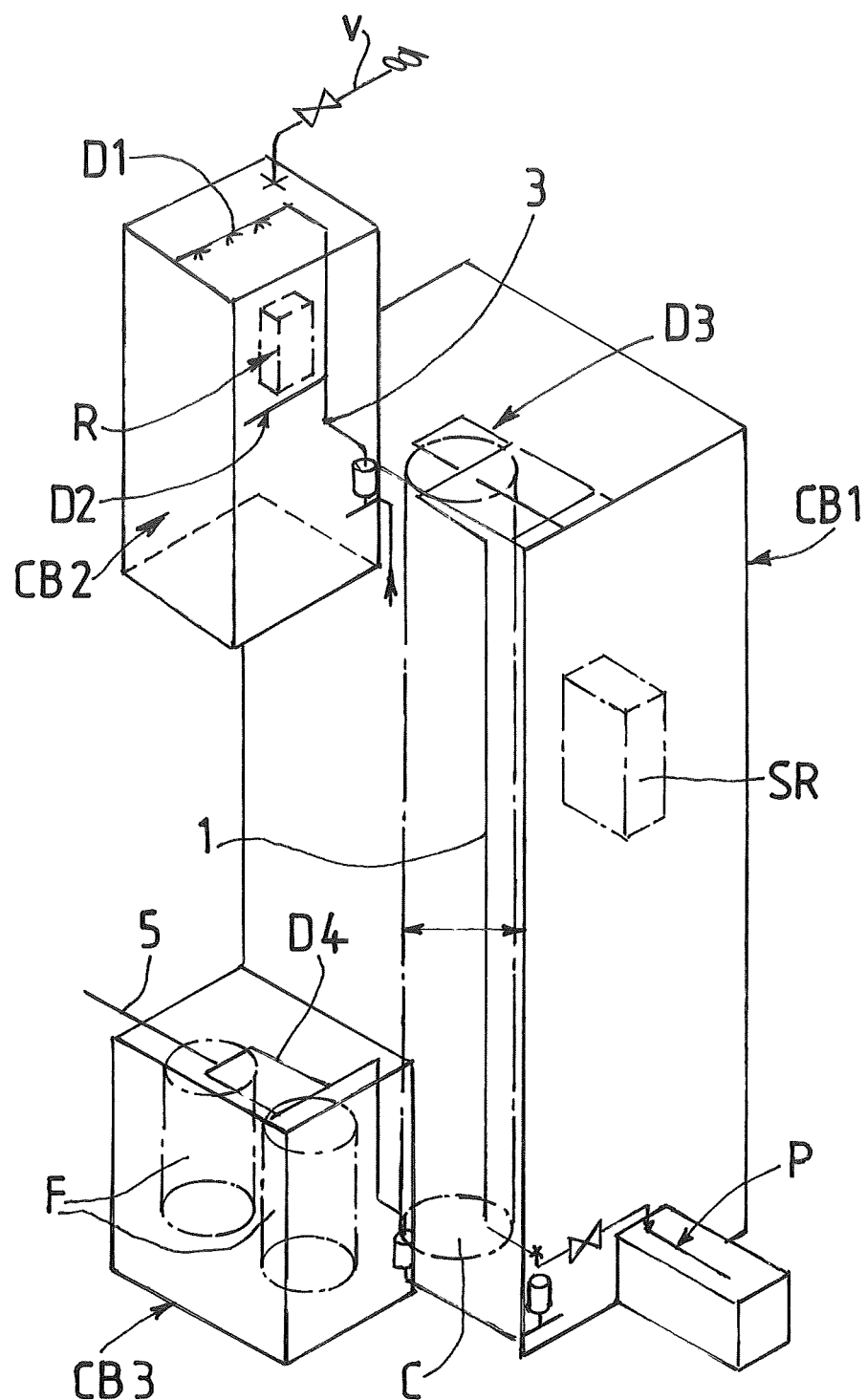
FIG. 1 provides an embodiment of the present invention.

FIG. 1 shows an air separation unit using cryogenic distillation comprising three insulated chambers according to the invention. A double column C is arranged inside a first chamber CB1, the column being surrounded by perlite. The chamber also contains a heat exchanger SR. The chamber CB1 may have an addition of connecting boxes leading to pumps or turbines P. An argon separation column surmounted by a top-end condenser R is arranged inside a second chamber CB2, insulated with perlite. A third chamber CB3 contains filters F.

The nitrogen ventilation system comprises flow-injection equipment made up of an isolation or regulating valve, a float-type flow meter, and a valve (if the supply pressure is >1 bar).

The nitrogen circulates through non-porous and non-perforated vertical supply pipes 1. Above the column C the nitrogen is poured into a perforated distribution manifold D3, consisting of horizontal pipes bent into squares and arranged just above the column C. The manifolds are made up of perforated tubes. The perforations formed in the tubes have a diameter of 6 mm and are pierced approximately every 100 mm and then covered in glass fabric if the insulation is perlite. The distribution manifolds, and the supply piping, are made of steel tube according to the class of piping and are assembled by straight section miter welded at 45°. The manifold, which is square in shape, is placed directly above the dome of the column, so that the nitrogen enters the insulation just above the column. The support is made up of the casing framework, in the roof of the chamber CB1.

The nitrogen is therefore injected only from the top of the chamber. Upon contact with the cold surfaces of the pipes, heat exchangers and/or columns, it becomes more dense and drops. Once it reaches the bottom of the chamber, arriving at the walls of the structure, it heats back up again and rises again, thus creating convection currents from the top downward and the top and the bottom. This ensures that nitrogen circulates inside the cold box.

For the second chamber CB2, distributors D1, D2 in the form of perforated horizontal pipe distribute the nitrogen over the condenser R and the column (which is not illustrated).

For the third chamber CB3, a perforated manifold formed by at least one perforated metal pipe is arranged over the filters F, which are used to filter the liquid oxygen produced by the column C. The manifold is supplied from a non-porous and non-perforated pipe 5. The same is also true of the connecting boxes leading to pumps and turbines P.

If a chamber contains an exchanger, for example a brazed aluminum plate and fin exchanger, the nitrogen is tipped out directly over the hot end of the heat exchanger.

The nitrogen comes from the column C itself and leaves the column and is heated to ambient temperature before being sent to the flushing-gas circuit at this temperature. The nitrogen will then be cooled as it passes through the insulation from ambient temperature down to the operating temperature of the column C. As an alternative, the nitrogen may come from an existing storage facility or network, for example the start-up phases.

Because the chamber is airtight, the nitrogen leaves the chamber via a pipeline V and is sent out into the air.

Figure 2:
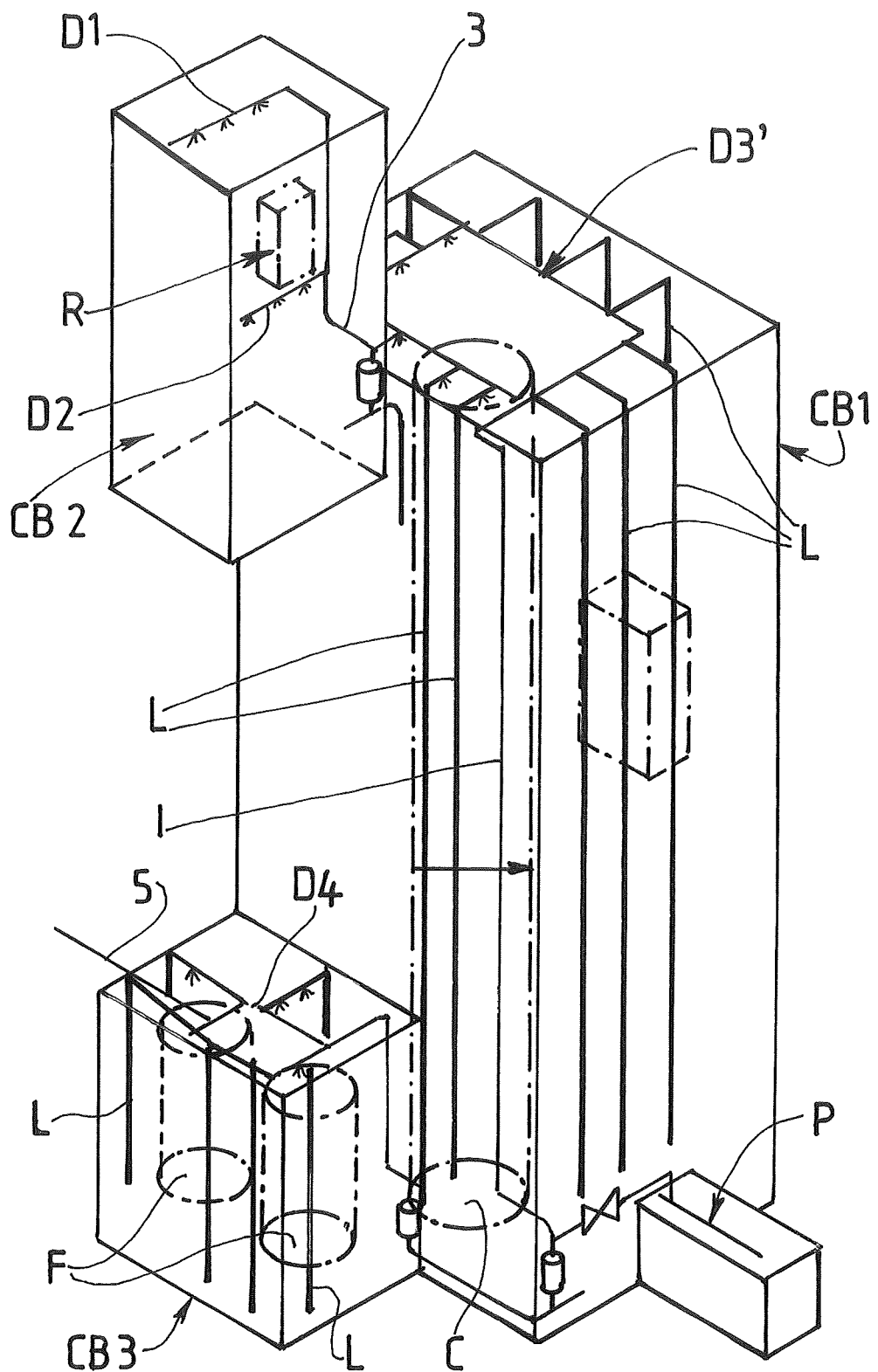
FIG. 2 provides an alternate embodiment of the present invention.

FIG. 2 shows insulated chambers that are improved by comparison with those of FIG. 1. The system of FIG. 1 exhibits a number of defects in terms of cost and installation lead-time.

The cost of this flushing system is not solely down to the cost of the materials (valve, float-type flowmeter, steel pipework, etc.) but rather includes the cost of manufacturing and installing such a system.

By way of example, for a medium-sized apparatus (1600 t/d of oxygen), the cost is around k€ 10 for the cold box of the distillation column having a diameter of 3.5 meters and a height of 52 meters.

The lead time for prefabricating such a system and installing it on site is also fairly long and may represent a real constraint in comparison with the final creation of an air separation unit (ASU). By way of example, the lead time for a medium-sized (1600 t/d of oxygen) piece of equipment is 2 weeks.

The efficiency of the system of FIG. 1 in terms of flushing through the entirety of the insulation present in the cold box is fairly low because the gaseous nitrogen is injected only at one end of the cold box and has to cover a large distance also across a large cross section. In addition, the insulation installed in the cold box is more or less compact (dense) according to whereabouts in the cold box it is situated and therefore presents different pressure drops from one location to another, thereby creating preferred pathways where there is a high nitrogen flow rate and others where there is a very low one, if any flow rate at all.

Certain zones are therefore not flushed with gaseous nitrogen or are insufficiently flushed.

According to the alternative form in FIG. 2, some of the flushing nitrogen is distributed using the same means as in FIG. 1. The means D1, D2, D3, D4 continue to distribute nitrogen over elements operating at the coldest temperatures and are supplied directly by the pipes 1, 3, 5 made of metal and which are rigid. To ensure better distribution of the nitrogen, another proportion of the flushing nitrogen is supplied by a network of at least one porous flexible pipe, preferably commercially available. This at least one flexible pipe L may be positioned vertically along the walls of the cold box, thus providing even distribution of nitrogen over the entire height and cross section of the cold box.

For preference, a series of flexible pipes are arranged parallel to one another so that no part of the wall of the chamber is more than a minimal distance away from a pipe. In the example, three flexible pipes L are arranged along the interior of a wall of the chamber and may be fixed to this wall. The pipes may be supplied in such a way that the nitrogen descends from the top of the chamber toward the bottom of the chamber. Either the pipe is closed at the bottom, so that all of the nitrogen passes through the wall of the pipe or rises back up in the pipe. If not, the pipe may form part of a network.

Because the flexible pipe L is porous, for example having a porosity of 5%, which means to say that 5% of the surface is made up of open pores, and has a length at least equal to half the length of the chamber, or even substantially the same length as the height of the chamber, the entire interior wall of the chamber is constantly flushed with nitrogen.

The flexible pipes will preferably be assembled using commercially available couplings (tees, plugs, elbows, reducers or valves).

The porous pipes may be made of polyethylene, polyvinyl chloride, agglomerated rubber particles. The use of this kind of material is made possible by the fact that they are surrounded by the nitrogen-rich flushing gas.

The porous pipes have an internal diameter ranging for example from 10 to 16 mm.

In some cases, the material of the porous pipe cannot be used at the lowest temperature found inside the chamber. In such a case, the porous pipe will be used only in those parts of the chamber where the temperature is above a threshold, for example −100° C., or −50° C. In parts of the chamber where the temperature is below this threshold, only distribution means that can be used at low temperature, for example rigid metal pipes, will be used. Obviously, the metal pipes may also be present in those parts of the chamber where the temperature is above the threshold.

As can be seen in FIG. 2, the porous pipes L have a vertical part running along the vertical wall of the chamber, and a horizontal part.

The manifold of rigid metal pipes D1, D2, D3, D4, which is square in shape, will be installed at the top of the equipment contained in the cold box as before. The curtain of porous pipe L may hang down from the top of the square manifold and be fixed, if need be, to the interior vertical walls of the cold box. The manifold of pipes installed at the top of the equipment may also be made up of porous pipes. This manifold may be square, star-shaped, etc.

The flushing nitrogen may be supplied by a circuit of rigid pipes independent of the circuit of flexible pipes. Otherwise, the flexible-pipes network may be connected to the rigid-pipes network.

The main benefit is that it ensures an even distribution of gaseous nitrogen through the casing of the cold box using a system that is simple, inexpensive, and quick to install. The retail price of these porous pipes is just € 42 per 50 linear meters (for a porous pipe measuring 16 mm×22 m, for automatic sprinkling micro irrigation). This rate becomes markedly less expensive to industry and for larger quantities. In addition, the porosity of the pipe means it can be installed directly in the perlite without the latter entering the pipes and thus being able to present problems of blockage.

The use of these porous pipes also makes it possible:
To reduce the cost of the present system while getting around the phase of drilling the square manifold with 6 mm diameter holes every 100 mm.
To reduce the installation time (no angled cuts to be made in the distribution manifold, no more welding, no further need to encase the square distribution manifold when it is in perlite).
To reduce the weight of the cold box when the latter is in a packet. The weight of the porous micropipe is around 100 g per linear meter, as compared with steel pipe which weighs 2.5 kg per linear meter.

In the example of FIG. 2, only the chamber CB1 comprises vertical porous pipes but it is clear that this arrangement could be deployed in each of the chambers.

The invention applies to any thermally insulated chamber requiring a gaseous nitrogen flushing system and, in particular, to insulated chambers that make it possible to limit exchanges of heat between the external environment and the various cryogenic industrial equipment (distillation columns, heat exchangers) of air separation units or mixing units in which the key components are nitrogen and/or hydrogen and/or carbon monoxide and/or carbon dioxide and/or methane.

It will be appreciated that while the invention has been illustrated with respect to double-column separation equipment producing argon and oxygen in liquid form, it is clear that the invention applies to a chamber that forms part of a single column air separation unit or a unit that does not produce argon or does not produce oxygen.

The invention applies to chambers containing columns with a distillation or scrubbing of mixtures other than air, for which separation is performed at subambient temperatures, such as syn-gases containing hydrogen and/or carbon monoxide or other mixtures containing methane and/or carbon dioxide and/or carbon monoxide and/or nitrogen and/or oxygen and/or hydrogen.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A method for flushing an insulated chamber having several walls and being substantially airtight; the method comprising:
    providing the insulated chamber comprising:
        at least one element to be insulated which is configured to operate at a cryogenic temperature, wherein the at least one element being selected from the group consisting of a storage facility, a distillation column, a scrubbing column containing means allowing an exchange of heat and of matter, a heat exchanger, a vaporizer-condenser, a metal pipe, a filter and combinations thereof, wherein the space around the element or the elements is filled with solid insulation, and
        a first piping network configured to introduce a flushing gas containing at least 95% nitrogen into the insulation, wherein at least a portion of the first piping network is arranged at a position vertically above at least one element that is to be insulated, so that the gas can seep out to a location vertically above the at least one element that is to be insulated; and
    injecting the flushing gas containing at least 95% nitrogen into the insulation using the first piping network so that the flushing gas is injected into the insulation in at least a position vertically above at least one element that is to be insulated so that the gas seeps out to a location vertically above the element that is to be insulated.

2. The method as claimed in claim 1, wherein the insulated chamber further comprises a second piping network configured to inject the flushing gas into the insulation, the second piping network comprising at least one pipe that runs along an inside of at least one vertical wall of the chamber, wherein the at least one pipe is configured to introduce the flushing gas at different vertical locations of the chamber.

3. The method as claimed in claim 1, wherein the first piping network comprises at least one rigid perforated pipe.

4. The method as claimed in claim 2, wherein the at least one pipe of the second piping network is comprised of a porous pipe, the porous pipe having a length equal to at least half the height of the chamber.

5. The method as claimed in claim 4, wherein the porous pipe is disposed only in part of the chamber that is operating at a temperature above a threshold, the threshold being higher than the minimum temperature of the chamber.

6. The method as claimed in claim 5, wherein the threshold is warmer than −100° C.

7. The method as claimed in claim 6, wherein the first piping network comprises at least one rigid perforated pipe made of metal and in which the first piping network is disposed in a part of the chamber that is operating at a temperature below the threshold.

8. The method as claimed in claim 4, wherein the second piping network comprises at least three parallel flexible pipes positioned vertically inside the chamber, each having a length equal to at least half the height of the chamber.

9. The method as claimed in claim 8, wherein the flexible pipes are porous over their entire surface such that the flexible pipes supply gas over at least most of the height of the chamber.

10. The method as claimed in claim 9, wherein the pores of the flexible pipes have a diameter of between 1 and 100 µm.

11. The method as claimed in claim 8, wherein the at least three flexible pipes are arranged parallel to one another vertically along the walls of the chamber so that no part of the wall of the chamber is more than a minimal distance away from one of the flexible pipes.

12. The method as claimed in claim 2, wherein the second piping network further comprises at least one flexible pipe positioned horizontally inside the chamber, running along the roof of the chamber.

13. The method as claimed in claim 2, wherein the first piping network and the second piping network penetrate the solid insulation.

14. The method as claimed in claim 13, wherein the second piping network is configured to circulate the flushing gas from the bottom of the second piping network upward.

15. The method as claimed in claim 1, wherein the first piping network comprises porous pipes.

16. The method as claimed in claim 1, wherein the first piping network comprises a manifold above the at least one element, wherein the manifold is in the shape of a square.

17. The method as claimed in claim 1, wherein the porous pipe of the second piping network is made of polyethylene, polyvinyl chloride, or agglomerated rubber particles.

18. The method as claimed in claim 1, wherein the at least one element to be insulated is a distillation column.

* * * * *